(12) United States Patent
Knapp et al.

(10) Patent No.: US 8,051,380 B2
(45) Date of Patent: Nov. 1, 2011

(54) COMMUNICATING SHARED ELECTRONIC CALENDAR MODIFICATIONS

(75) Inventors: John Eugene Knapp, Seattle, WA (US);
Doreen Nelson Grieb, Kirkland, WA (US); Todd Haugen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 681 days.

(21) Appl. No.: 11/680,337

(22) Filed: Feb. 28, 2007

(65) Prior Publication Data
US 2008/0209344 A1 Aug. 28, 2008

(51) Int. Cl.
G06F 3/00 (2006.01)
G06Q 10/00 (2006.01)

(52) U.S. Cl. ...................... 715/751; 705/7.19

(58) Field of Classification Search .......... 715/751–752, 715/963; 368/29; 708/112; 705/7.19
See application file for complete search history.

(56) References Cited

U.S. PATENT DOCUMENTS

| | | | |
|---|---|---|---|
| 4,162,610 A | 7/1979 | Levine | |
| 4,819,191 A | 4/1989 | Scully | |
| 5,070,470 A | 12/1991 | Scully | |
| 5,970,466 A * | 10/1999 | Detjen et al. | 705/7.19 |
| 6,781,920 B2 | 8/2004 | Bates | |
| 6,820,096 B1 | 11/2004 | Kanevsky | |
| 7,028,178 B2 | 4/2006 | Orlick | |
| 7,353,466 B2 * | 4/2008 | Crane et al. | 715/752 |
| 2001/0051892 A1 * | 12/2001 | Brown | 705/9 |
| 2002/0019835 A1 | 2/2002 | Baur | |
| 2002/0034288 A1 | 3/2002 | Hagebarth | |
| 2004/0268270 A1 * | 12/2004 | Hill et al. | 715/963 |
| 2005/0272408 A1 | 12/2005 | Wilkes-Gibbs | |
| 2006/0095859 A1 | 5/2006 | Bocking | |
| 2006/0129442 A1 | 6/2006 | Wu | |
| 2006/0203620 A1 | 9/2006 | Bedingfield, Sr. | |
| 2007/0168892 A1 * | 7/2007 | Brush et al. | 715/963 |

OTHER PUBLICATIONS

Pogue, "PalmPilot: The Ultimate Guide, 2nd Edition", O'Reilly Media, Inc., May 2, 2000, Chapter 9.3.*
Author Unknown, "Chapter 9, Appointments," http://www.dr-quad.com/products.htm, Quadratron Systems, pp. 9-1 to 9-47, 1985.
Author Unknown, "Enterprise Calendaring . . . Leverage Your Intranet to Improve Planning and Communication," 12 pp., CriticaPath, A White Paper, Aug. 1999, San Francisco, CA., http://web.princeton.edu/sites/calendarapt/wp_calendar.pdf.

* cited by examiner

*Primary Examiner* — William L Bashore
*Assistant Examiner* — Andrew Tank
(74) *Attorney, Agent, or Firm* — Shook, Hardy & Bacon L.L.P.

(57) ABSTRACT

A shared electronic calendar modification notice provides calendar users accessing the calendar with notification that a calendar modification has been made by another calendar user. A shared electronic calendar user accessing the shared calendar is identified. Upon identifying a shared electronic calendar user, calendar modifications that are new to the shared electronic calendar user are identified. Modification notices are then output to communicate the new calendar modifications to the calendar user.

18 Claims, 9 Drawing Sheets

COMMUNICATING SHARED ELECTRONIC CALENDAR MODIFICATIONS

BACKGROUND

A variety of electronic calendar solutions are available to assist users in planning and organizing appointments and tasks. Electronic calendar solutions are traditionally designed for individual electronic calendar users and may be modified by the user, the user's trusted assistant, or via a meeting request. Accordingly, the user generally has knowledge of electronic calendar modifications.

In contrast to personal electronic calendars in which the user maintains control over the calendar and has knowledge of any modified features, shared electronic calendars allow multiple users to modify the calendar. For instance, a family may use a shared electronic calendar to organize activities for the family members. Each family member may be able to access, view, and modify the shared electronic calendar. Additionally, the shared electronic calendar may receive calendaring information from external groups (e.g., a soccer team's electronic calendar).

Accordingly, the nature of a shared electronic calendar makes it more difficult for users to remain apprised of modifications to the calendar. For instance, when a shared electronic calendar user makes a modification, the user may fail to notify other users of the modification. As such, shared electronic calendar users may need to diligently view the shared electronic calendar to identify modifications made by other shared electronic calendar users.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments are related to providing shared electronic calendar users with a modification notice to notify users accessing the calendar that a modification has been made in the calendar. In an embodiment, a shared electronic calendar user accessing the shared calendar is identified. Upon identifying a shared electronic calendar user, calendar modifications that are new to the shared electronic calendar user are identified. Modification notices are then output to communicate the new calendar modifications to the shared electronic calendar user.

BRIEF DESCRIPTION OF THE DRAWINGS

Embodiments are described in detail below with reference to the attached drawing figures, wherein.

DETAILED DESCRIPTION

Figure 1:
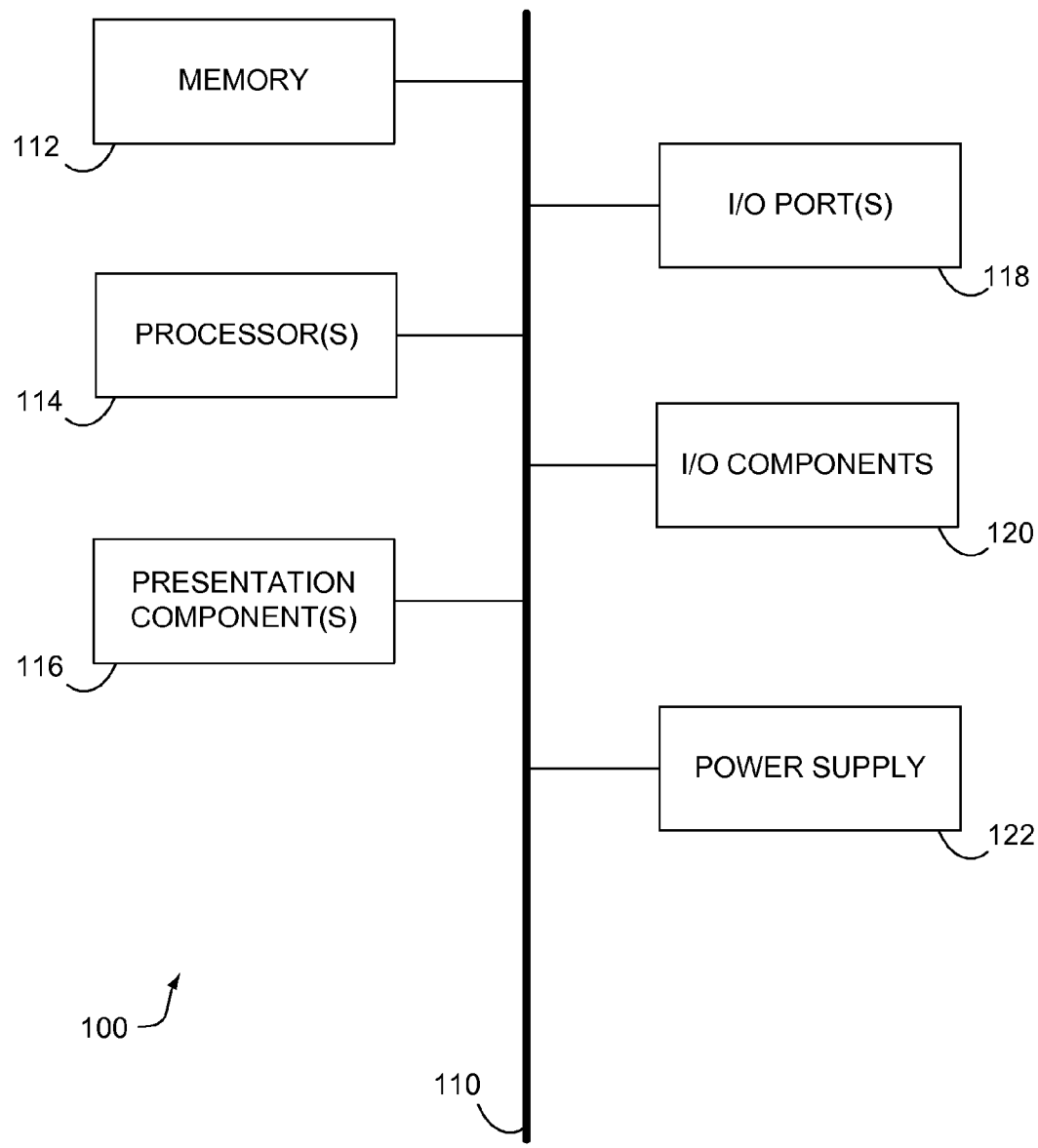
FIG. 1 is a block diagram of a computing-system environment for use in implementing an embodiment.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As previously mentioned, current shared electronic calendar solutions insufficiently communicate modifications to shared electronic calendar users. In particular, to notify shared electronic calendar users of modifications to the shared electronic calendar, the shared electronic calendar users must diligently view the calendar to identify modifications or a shared electronic calendar user who modifies the shared electronic calendar must independently communicate the modifications to the other shared electronic calendar users, such as, for example, via email. These approaches for communicating shared electronic calendar modifications, however, are time consuming and unreliable. As a result, modifications are not adequately communicated to shared electronic calendar users.

Embodiments hereinafter discussed relate to communicating shared electronic calendar modifications. In particular, embodiments allow, among other things, shared electronic calendar users to be notified of modifications to the shared electronic calendar, including appointment modifications and task modifications. Instead of requiring shared electronic calendar users to search for calendar modifications or requiring shared electronic calendar users to independently notify other shared electronic calendar users of modifications, embodiments hereinafter discussed provide simple and reliable notices of shared electronic calendar modifications.

In some shared electronic calendar embodiments, all shared electronic calendar users may have the same views of the shared electronic calendar. On the other hand, some shared electronic calendar embodiments enable shared electronic calendar users to have personalized views. For example, one shared electronic calendar user may be permitted to view more details pertaining to a scheduled appointment than other shared electronic calendar users. Because shared electronic calendar embodiments enable shared electronic calendar users to have personalized views, calendar modifications may be communicated to each shared electronic calendar user individually.

As used herein, the term "appointment" is used to refer to any calendar item that has a specified time (e.g., a specified start time and a specified end time), including all day events.

Additionally, as used herein, the term "task" is used to refer to any calendar item that does not have a specific time or duration. Accordingly, a task includes any item, including a to-do, an event or an occasion, that the user intends to address or complete at a general time, such as, for example, this morning, this afternoon, this evening, before another item, after another item, between two items, or during another item. Collectively, appointments and tasks will hereinafter be called calendar items.

Additionally, as used herein, the term "day view" is used to refer to a view of the calendar pertaining to a specific day. For example, a user viewing the day of Nov. 3, 2006 is viewing a first day view, while a user viewing the day of Nov. 5, 2006 is viewing a second day view. A user accesses the "same calendar view," as used herein, when the same day view, week view, month view, year view, or the like is accessed. For instance, a user viewing the day of Nov. 3, 2006 on two separate occasions is accessing the "same calendar view." While accessing the "same calendar view" includes accessing the same day view, etc., it does not imply that the content in the day view must be identical for both accessing occasions. Rather, a user may access the "same calendar view" even though a user accessing the Nov. 3, 2006 day view on a first occasion may view one appointment for that day while the same user accessing the Nov. 3, 2006 day view on a second occasion may view four appointments for that day. The term "week view" is used to refer to a view of the calendar pertaining to a specific week, such as Nov. 5, 2006 through Nov. 11, 2006. The term "month view" as used herein is used to refer to a view of the calendar pertaining to a specific month, such as November 2006. The term "year view" as used herein is used to refer to a view of the calendar pertaining to a specific year, such as 2006. Collectively, the terms will hereinafter be called calendar views. One skilled in the art will recognize that calendar views in addition to those identified above may be provided.

Further, as used herein, the term "shared electronic calendar user" is an entity that may access an electronic calendar accessible by multiple calendar users. A shared electronic calendar user accesses an electronic calendar when the calendar is available for viewing, modifying, or a combination thereof. A shared electronic calendar user may be a "modifying shared electronic calendar user," a "viewing shared electronic calendar user," or a combination thereof. A modifying shared electronic calendar user modifies the shared electronic calendar by, for example, canceling, uncanceling, updating, moving, creating, or deleting a calendar item. One skilled in the art will appreciate that a modifying user may be an individual, entity, or computer that provides modification. Upon making a specific calendar modification, a modifying shared electronic calendar user will remain a modifying user only with respect to the specific calendar modification made by the modifying user. With respect to all modifications made by other calendar users, the user will be considered a viewing shared electronic calendar user. A viewing shared electronic calendar user may access a shared calendar to view the calendar, including calendar modifications made by modifying shared electronic calendar users. One skilled in the art will appreciate that a shared electronic calendar user may, in one instance, be a modifying shared electronic calendar user with respect to a specific modification and, in another instance, be a viewing shared electronic calendar user with respect to another modification. For example, if shared electronic calendar user A cancels an appointment X, A is a modifying shared electronic calendar user with respect to the canceled appointment X. However, A is a viewing shared electronic calendar user with respect to other calendar modifications made by other shared electronic calendar users. In an embodiment where all shared electronic calendar users modify the shared electronic calendar, all users will be both modifying users and viewing users at various instances. In an embodiment where a limited number of shared electronic calendar user are permitted to modify the calendar, only the users modifying the calendar will be both modifying and viewing calendar users.

In one aspect, an embodiment is directed to a method for updating a shared electronic calendar with at least one new electronic calendar modification notice. The method includes identifying a first shared electronic calendar users accessing a shared electronic calendar at a first instance and identifying a second instance the first shared electronic calendar user accessed the shared electronic calendar, where the second instance precedes the first instance the first shared electronic calendar user accesses the shared electronic calendar. The method also includes determining at least one new electronic modification provided by a second shared electronic calendar user following the second instance the first shared electronic calendar user accessed the shared electronic calendar. The method further includes outputting at least one new electronic calendar modification notice.

In another aspect, an embodiment is directed to one or more computer-readable media embodying computer-useable instructions for performing a method of notifying a viewing shared electronic calendar user of at least one shared electronic calendar modification. The method includes identifying the viewing shared electronic calendar user accessing a calendar view of a shared electronic calendar at a first instance. The method also includes identifying a previous instance the viewing shared electronic calendar user accessed the calendar view of the shared electronic calendar. The method further includes determining at least one new shared electronic calendar modification entered by a modifying shared electronic calendar user after the previous instance the first shared electronic calendar user accessed the calendar view of the shared electronic calendar. The method further includes outputting at least one shared electronic calendar modification notice.

In a further aspect, an embodiment is directed to a graphical user interface embodied on one or more computer-readable media and executable on a computer. The graphical user interface includes a first display area of a shared electronic calendar configured to display one or more new electronic calendar modification notice to provide a first shared electronic calendar user notice of one or more new electronic calendar modification entered by a second shared electronic calendar user. The display of the one or more new electronic calendar modification notice is determined based on an identification of the first shared electronic user and an identification of a previous instance the first shared electronic user accessed the shared electronic calendar.

Having briefly described an overview of the present invention, an exemplary operating environment in which various aspects of the present invention may be implemented is described below in order to provide a general context for various aspects of the present invention. Referring initially to FIG. 1, an exemplary operating environment for implementing embodiments is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
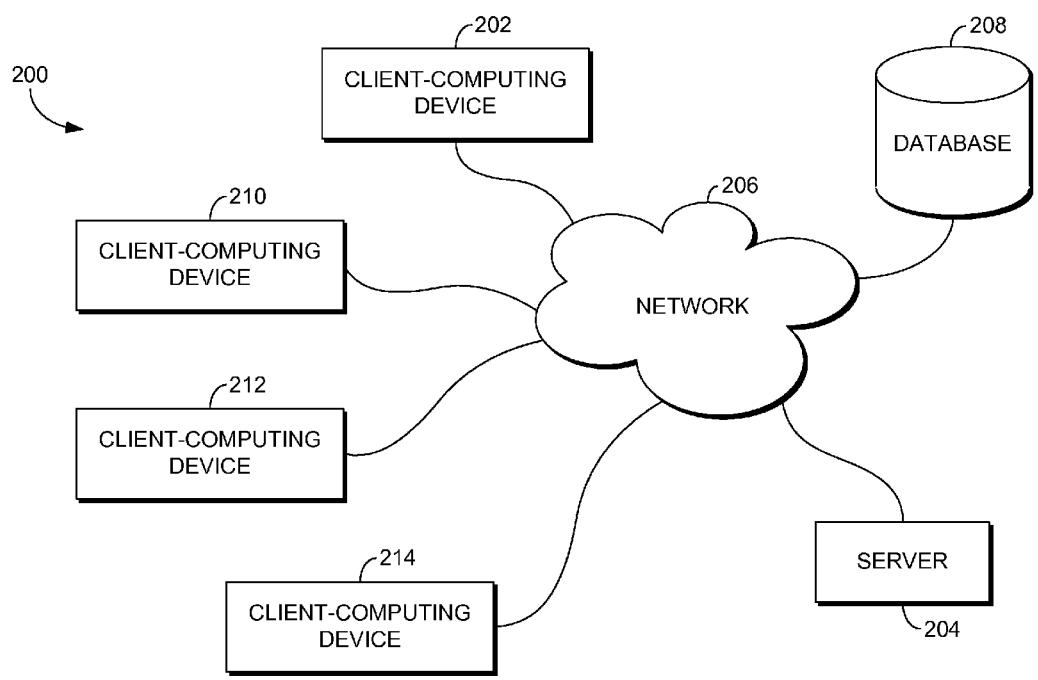
FIG. 2 is a block diagram of a networking environment for use in implementing an embodiment.

FIG. 2 illustrates a block diagram of a networking architecture for use in implementing an embodiment of the present invention. The networking architecture, generally referenced by numeral 200, comprises client-computing devices 202, 210, 212, and 214, server 204, and a database 208 which communicate via a network 206. It will be appreciated by one of ordinary skill in the art that networking architecture 200 is merely an example of one suitable networking environment and is not intended to suggest any limitation as to the scope of use or functionality of the present invention. Neither should networking architecture 200 be interpreted as having any dependency or requirement related to any single component or combination of components illustrated therein.

The client-computing devices 202, 210, 212, and 214 may be any type of computing device, such as device 100 described above with reference to FIG. 1. By way of example only and not limitation, the client-computing devices 202, 210, 212, and 214 may be a personal computer, desktop computer, laptop computer, handheld device, cellular phone, digital phone, PDA, or the like. It should be noted that the invention is not limited to implementation on such computing devices, but may be implemented on any of a variety of different types of computing devices.

Network 206 may include any computer network or combination thereof. Examples of computer networks configurable to operate as network 206 include, without limitation, a wireless network, landline, cable line, fiber-optic line, LAN, WAN, peer-to-peer, or the like. Network 206 is not limited, however, to connections coupling separate computer units. Rather, network 206 may also comprise subsystems that transfer data between servers or computing devices. For example, network 206 may also include a point-to-point connection, tan internal system Ethernet, a backplane bus, an electrical bus, a neural network, or other internal system. In an embodiment where network 206 comprises a LAN networking environment, components are connected to the LAN through a network interface or adapter. In an embodiment where network 206 comprises a WAN networking environment, components use a modem, or other means for establishing communications over the WAN, to communicate. In embodiments where network 206 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

The server 204 may include any type of application server, database server, or file server configurable to perform the methods described herein. In addition, the server 204 may be a dedicated or shared server. One example, without limitation, of a server that is configurable to operate as the server 204 is a structured query language ("SQL") server executing server software such as SQL Server 2005, which was developed by the Microsoft® Corporation headquartered in Redmond, Wash.

Components of server 204 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via network 206. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the server 204 is illustrated as a single box, one skilled in the art will appreciate that the server 204 is scalable. For example, the server 204 may in actuality include 100 servers in communication. Alternatively, the network architecture of FIG. 2 may operate without a server such as, for example, in a LAN or peer-to-peer network. Moreover, the database 208 may be included within the server 204 or client-computing devices 202, 210, 212, or 214 as a computer-storage medium. The single unit depictions are meant for clarity, not to limit the scope of embodiments in any form.

Figure 3:
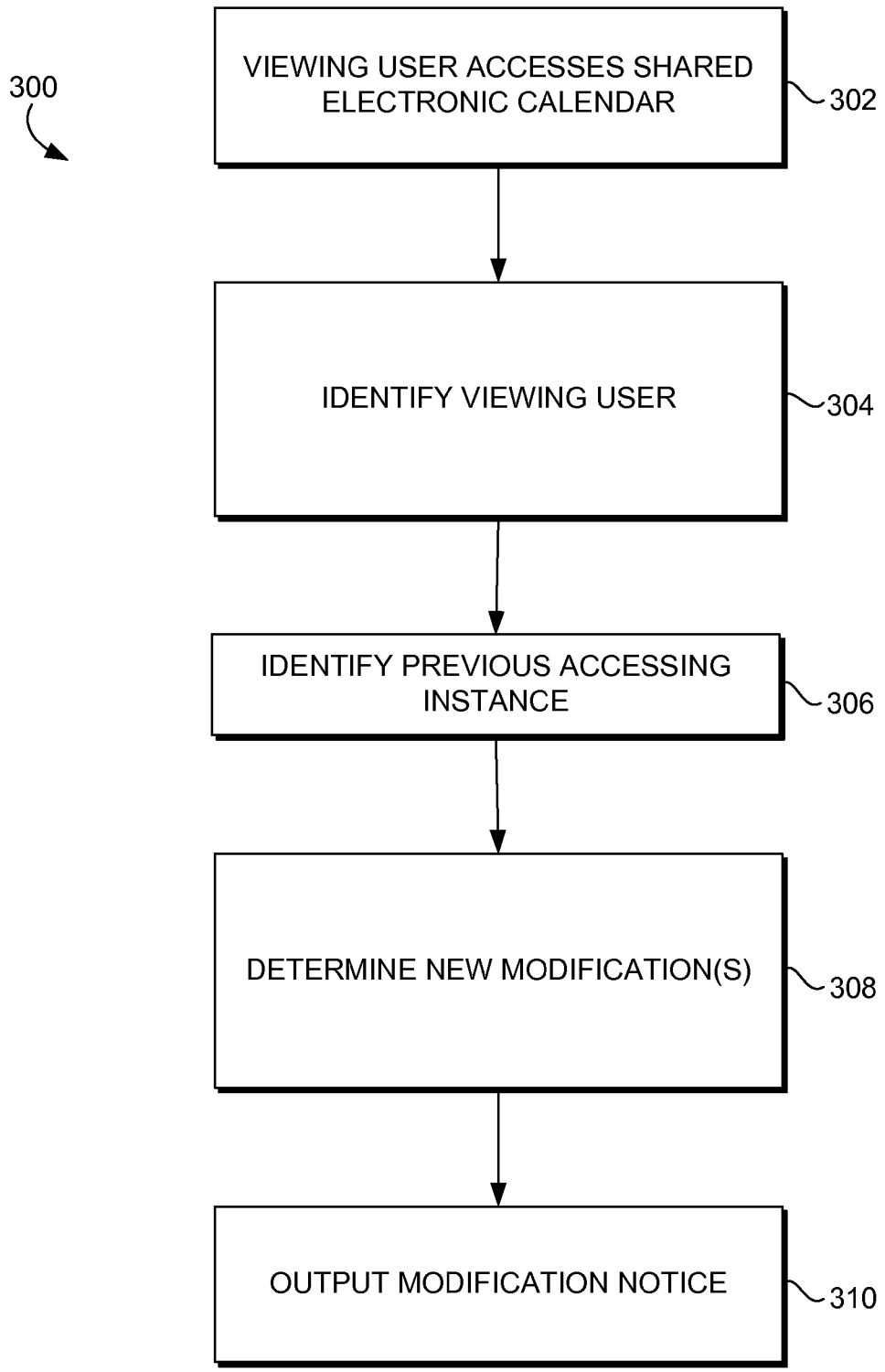
FIG. 3 is a flow diagram illustrating an exemplary method for communicating new electronic calendar modifications to a shared electronic calendar user.

Turning now to FIG. 3, a flow diagram is provided illustrating an exemplary method 300 for communicating electronic calendar modifications to shared electronic calendar users in accordance with one embodiment. As shown at block 302, a viewing shared electronic calendar user accesses the shared electronic calendar. A viewing shared electronic calendar user accesses the shared electronic calendar when the calendar is available for viewing, modifying, or a combination thereof. The viewing shared electronic calendar user is identified at block 304. The viewing shared electronic calendar user may be identified, for example, by a user's login username or password, a user's default computer, or a unique user identifier such as, for example, the user's fingerprint or voice.

After a viewing shared electronic calendar user is identified at block 304, a previous instance that the viewing user accessed the shared electronic calendar is identified at block 306. In one embodiment, the previous instance the user accessed the shared electronic calendar comprises the immediately preceding instance the user accessed the calendar generally (e.g., any calendar view within the calendar). In another embodiment, the previous instance the user accessed the shared electronic calendar comprises the most recent prior instance the user accessed the same calendar view as the user is currently viewing. For example, if, on Oct. 31, 2006, a user views the day view of Nov. 3, 2006, then a previous instance the user accessed the same calendar view (i.e., the Nov. 3, 2006 day view) would be an access time prior to Oct. 31, 2006. In some embodiments, a previous access instance may not be identified because the viewing user is accessing the calendar for the first time or the user has not previously viewed the same calendar view. In such cases, the previous instance may be identified as a default, such as, for example, the instance the shared electronic calendar originated or the instance the shared electronic calendar user joined the shared electronic calendar.

At block 308, at least one new shared electronic calendar modification made by a modifying shared electronic calendar user is determined. A new electronic calendar modification is a modification made following the previous access instance identified at block 304. A calendar modification may include actions such as canceling, uncanceling, deleting, moving, updating, creating, etc. Canceling calendar items may be used to refer to removing a properly created calendar item from the calendar. Uncanceling calendar items may be used to refer to restoring the canceled calendar item. Deleting calendar items may refer to removing a calendar item created in error. Updating calendar items may refer to modifying calendar item details. Creating may be used to refer to adding calendar items to the calendar. Moving calendar items may be used to refer to moving a calendar item from one calendar period to another calendar period. In one embodiment, when a calendar item is moved, the original calendar item remains in the original calendar location and a second calendar item is created representing the new time. The original calendar item is marked as moved, and the new date and time information may be reflected with a link to the new calendar item.

To determine a new calendar modification, in one embodiment, a modification instance may be identified and compared to the previous access instance identified at block 306. Accordingly, a modification is new if the modification occurred following the previous access instance identified at block 306.

Upon determining a new electronic calendar modification, a modification notice is output at block 310. The modification notice signifies to the viewing shared electronic calendar user that a modifying shared electronic calendar user has modified at least one calendar item.

Figure 4:
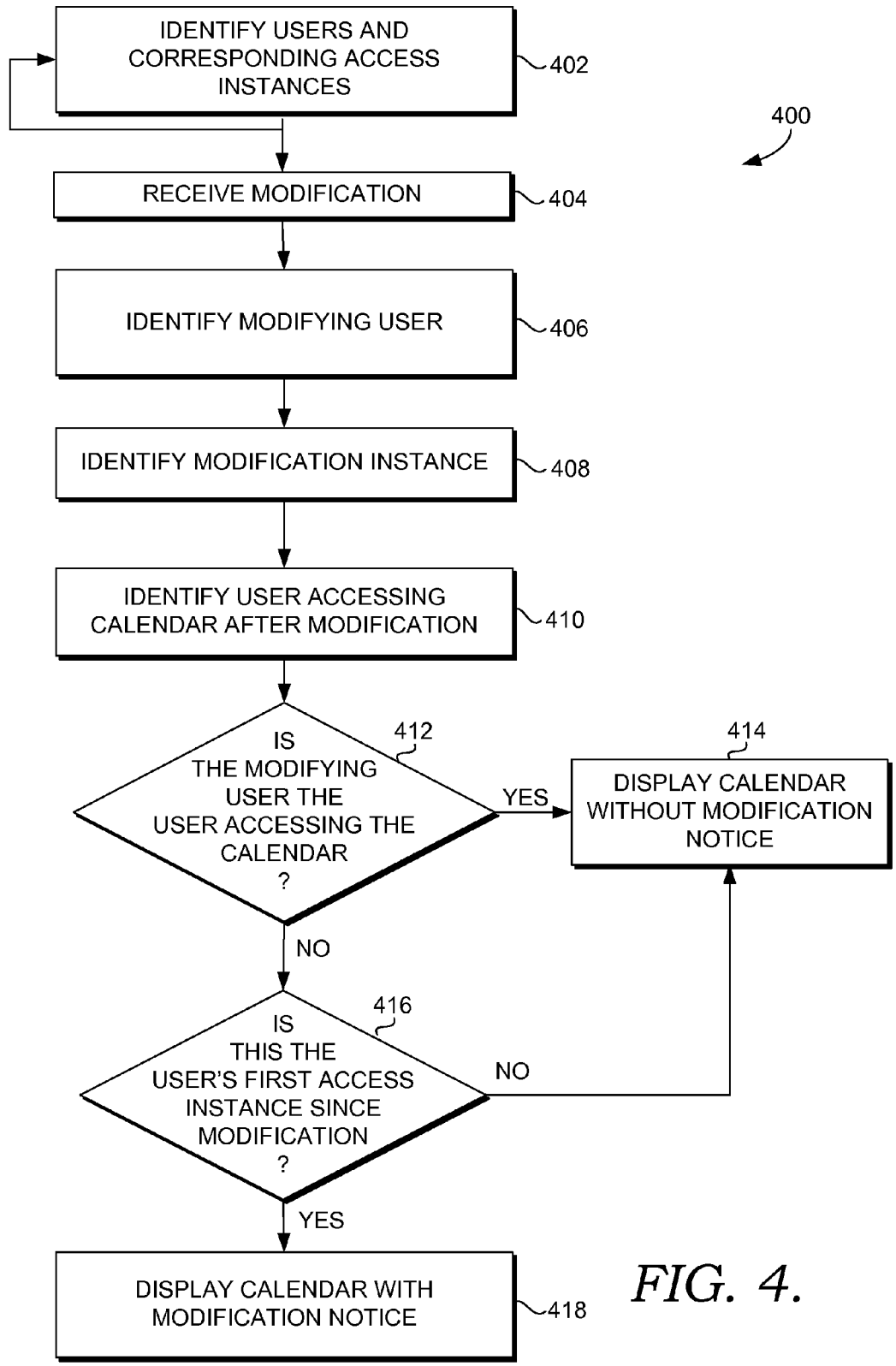
FIG. 4 is a flow diagram illustrating another exemplary method for communicating new electronic calendar modifications to a shared electronic calendar user.

FIG. 4 provides an exemplary method 400 for communicating new electronic calendar modifications to a shared electronic calendar user where modification notices are output to shared electronic calendar users accessing the calendar for a first time following the modification. While FIG. 3 provides a general method for communicating new electronic calendar modifications, FIG. 4 provides a method specific to an embodiment that displays a modification notice to shared electronic calendar users accessing the calendar for the first time since the modification. As represented at block 402, shared electronic calendar users, including modifying and accessing users, are identified each time they access the shared electronic calendar. A shared electronic calendar user accesses the shared electronic calendar when the calendar is available for viewing, modifying, or a combination thereof. Each shared electronic calendar user may be identified, for example, by a user's login username or password, a user's default computer, or a unique user identifier such as, for example, the user's fingerprint or voice. As shown at block 402, the shared electronic calendar users' access instances are also identified. The shared calendar users' identified access instances may include, among other things, an initial access time, a durational access time, an access end time, an access view initial time, an access view durational time, an access view end time, or combination thereof. An access view time is a time related to accessing a specific calendar view. As shown in the embodiment of FIG. 4, the shared electronic calendar user and related access time are identified each instance a user accesses the shared electronic calendar. The identified users and the associated access instances may be stored in a database or other storage device that may reside on a client-computer or server computer. Alternatively, the identified users and the associated access instances may be stored independent of the client-computer or server computer. Accordingly, such information may be subsequently used to identify new modifications.

At block 404, a calendar modification made by a modifying shared electronic calendar user is received. The modifying calendar user who provided the calendar modification is identified at block 406. Additionally, the modification instance is identified at block 408. The identified modifying shared electronic calendar user and the associated modification instance may also be stored in a database or other storage device that may reside on a client-computer or server computer or stored independent of the client-computer or server computer.

A shared electronic calendar user accesses the calendar after the modification has been made by the modifying shared electronic calendar user. The share electronic calendar user is identified at block 410.

At block 412, it is determined whether the user accessing the calendar after the modification is the same user as the modifying user who made the modification. To make this determination, in one embodiment, the user identified at block 410 is compared against the user identified as the modifying user at block 406. If the user accessing the shared electronic calendar is the modifying user, at block 414, the calendar will be displayed without a new modification notice.

On the other hand, if it is determined that the shared electronic calendar user accessing the calendar is not the modifying user, the user accessing the shared calendar is a viewing shared electronic calendar user with respect to the specific modification. At block 416, whether the viewing user is accessing the calendar for the first time since the modification instance is determined. If it is determined that the viewing user has accessed the calendar since the modification instance but prior to the current instance, the calendar is displayed without a new modification notice at block 414. Alternatively, the calendar is displayed to the viewing user with a new modification notice at block 418 if the current instance is the first time the viewing user has accessed the calendar since the modification instance.

In another embodiment, rather than providing the new modification notice for only the first accessing instance after the modification, the new modification may be provided for multiple accessing instances or for a predetermined time duration. For example, a modification notice pertaining to a new modification may be displayed for the first five instances or first five days a shared electronic calendar user accesses the calendar. In another embodiment, a modification notice may continued to be displayed in a calendar view until the viewing user indicates recognition of the modification notice.

Figure 5:
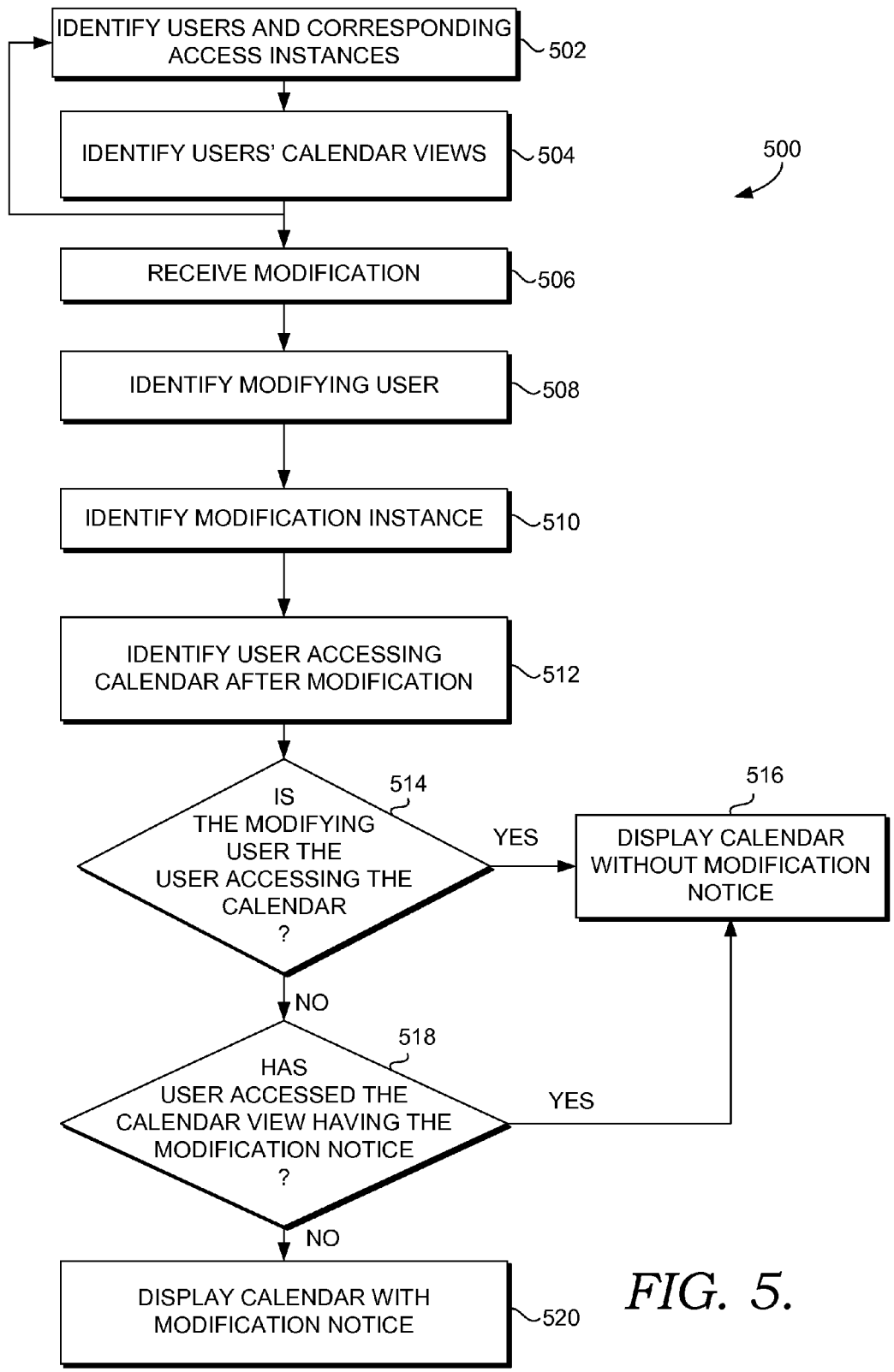
FIG. 5 is a flow diagram illustrating a further exemplary method for communicating new electronic calendar modifications to a shared electronic calendar user.
Figure 6:
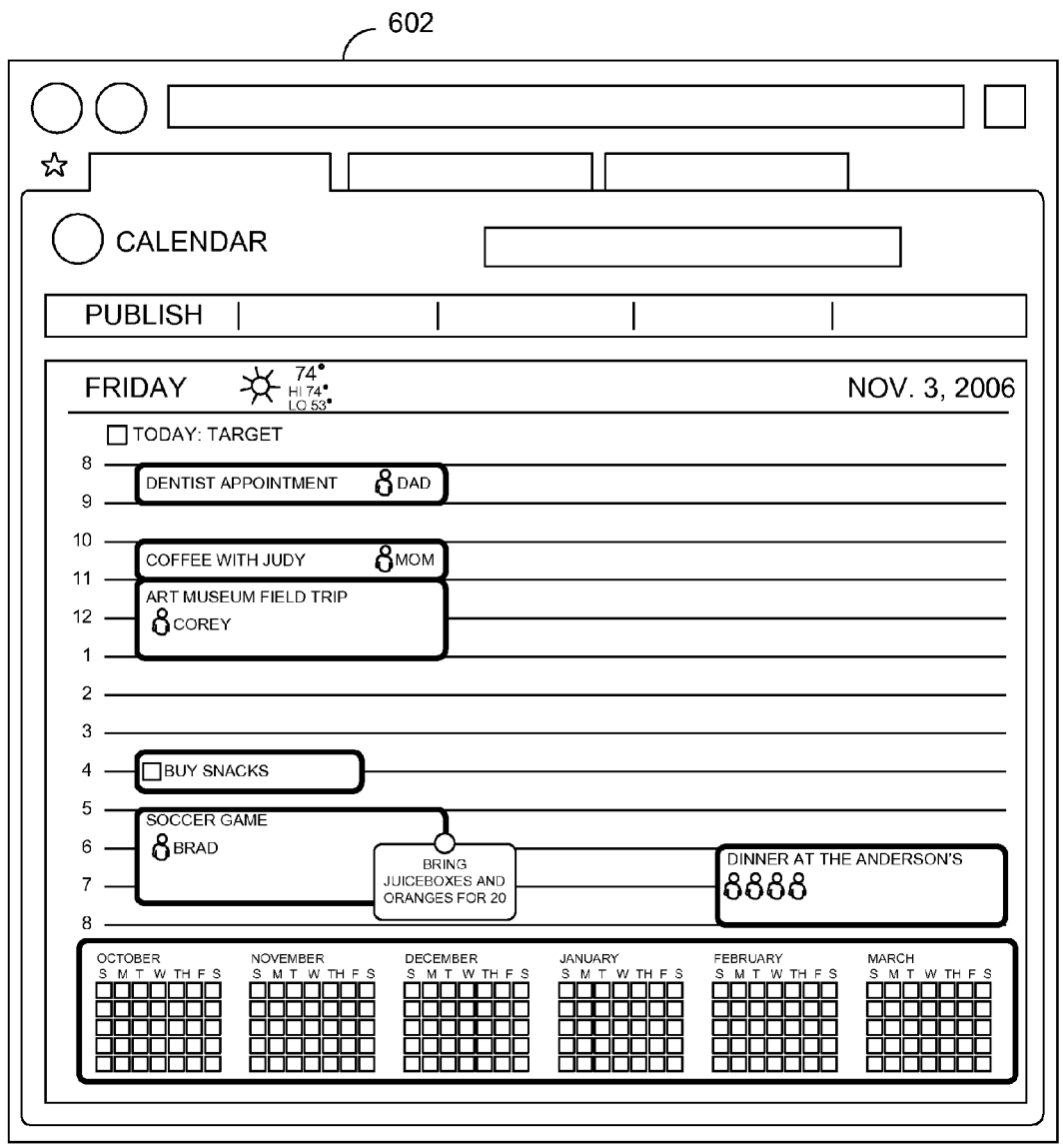
FIG. 6 is an exemplary screen display showing an example of a specific day calendar view prior to electronic calendar modifications.

FIG. 5 provides an exemplary method example 500 for communicating new electronic calendar modifications to a shared electronic calendar user where modification notices are output to shared electronic calendar users accessing, for a first time following the modification, the calendar view having the modification notice. While FIG. 4 provides a method for communicating modifications by displaying a modification notice to shared electronic calendar users accessing the calendar for the first time since the modification, FIG. 5 provides a method for communicating modifications by displaying a modification notice to shared electronic calendar users accessing, for the first time, the calendar view displaying the modification notice. At block 502, all shared electronic calendar users, including modifying and accessing users, are identified when users access the shared electronic calendar. The shared electronic calendar users' access instances are also identified at block 502. At block 504, all shared electronic calendar users' calendar views and corresponding access times are identified. As demonstrated in FIG. 5, in one embodiment, shared electronic calendar users, calendar views, and related access times are identified each instance a user accesses the shared electronic calendar or a calendar view. The users and their associated access times as well as the views accessed may be stored in a database or other storage device that may reside on a client-computer or server or may reside independent of the client-computer or server.

At block 506, a calendar modification made by a modifying shared calendar user is received. The modifying user that modifies the calendar is identified at block 508, and the modification instance is identified at block 510. Details pertaining to modifications may also be stored in a database or other storage location.

At block 512, a shared calendar user who accesses the calendar view in which the modification was made at an instance after the modification is identified. It is then determined, at block 514, whether the user accessing the calendar is the modifying user. If the user accessing the calendar is the modifying user, the calendar will be displayed without a new modification notice at block 516.

On the other hand, if it is determined that the shared electronic calendar user accessing the calendar is not the modifying user, the user accessing the shared calendar is a viewing shared electronic calendar user with respect to the specific modification. At block 518, it is determined whether the viewing user has, since the modification instance, accessed the calendar view having the modification notice. To determine whether the viewing user has, since the modification instance, accessed the calendar view having the modification notice, in one embodiment, the calendar views and corresponding calendar view access instances identified at block 504 may be compared to the modification instance identified at 510.

With reference to block 518, if the viewing user has accessed the calendar view having the modification notice, the calendar view is displayed without a new modification notice at block 516. Alternatively, the calendar view is displayed to the viewing user with a new modification notice at block 520 if the viewing user has not accessed the calendar view having the modification notice since the modification instance.

In another embodiment, rather than providing the new modification notice for only the first accessing instance of the calendar view, having the modification, after the modification, the new modification may be provided for multiple accessing instances of the calendar view or for a predetermined time duration. For example, a modification notice pertaining to a new modification may be displayed for the first two instances or first two days a shared electronic calendar user accesses the calendar view having the modification. In another embodiment, a modification notice may continued to be displayed in a calendar view until the viewing user indicates recognition of the modification notice.

FIGS. 6-9 illustrate exemplary displays of graphical user interfaces for communicating calendar modifications, according to embodiments. The shared electronic calendar may be any electronic display of a calendar wherein users have access to the calendar to view and make modifications. The shared electronic calendar described herein may be displayed on client-computing devices 202, 210, 212, and 214. A shared electronic calendar user can interact with the displayed shared electronic calendar using well known input components—such as, for example, a mouse, joystick, stylus, touch screen, keyboard, or the like.

By way of illustration, the exemplary displays of FIGS. 6-9 show calendar views of a family's shared electronic calendar. Suppose, for instance, that Dad accesses the day view 602 of FIG. 6, for Nov. 3, 2006. In accessing the day view 602 of FIG. 6, Dad may view the multiple calendar items displayed on the Nov. 3, 2006 day view. Suppose further that after Dad accesses the day calendar view 602, Mom subsequently modifies calendar items in the Nov. 3, 2006 day calendar view. In particular, Mom moves the dentist appointment to another day, cancels coffee with Judy, and updates details of the soccer game (the location of the soccer game and who is playing in the soccer game).

Figure 7:
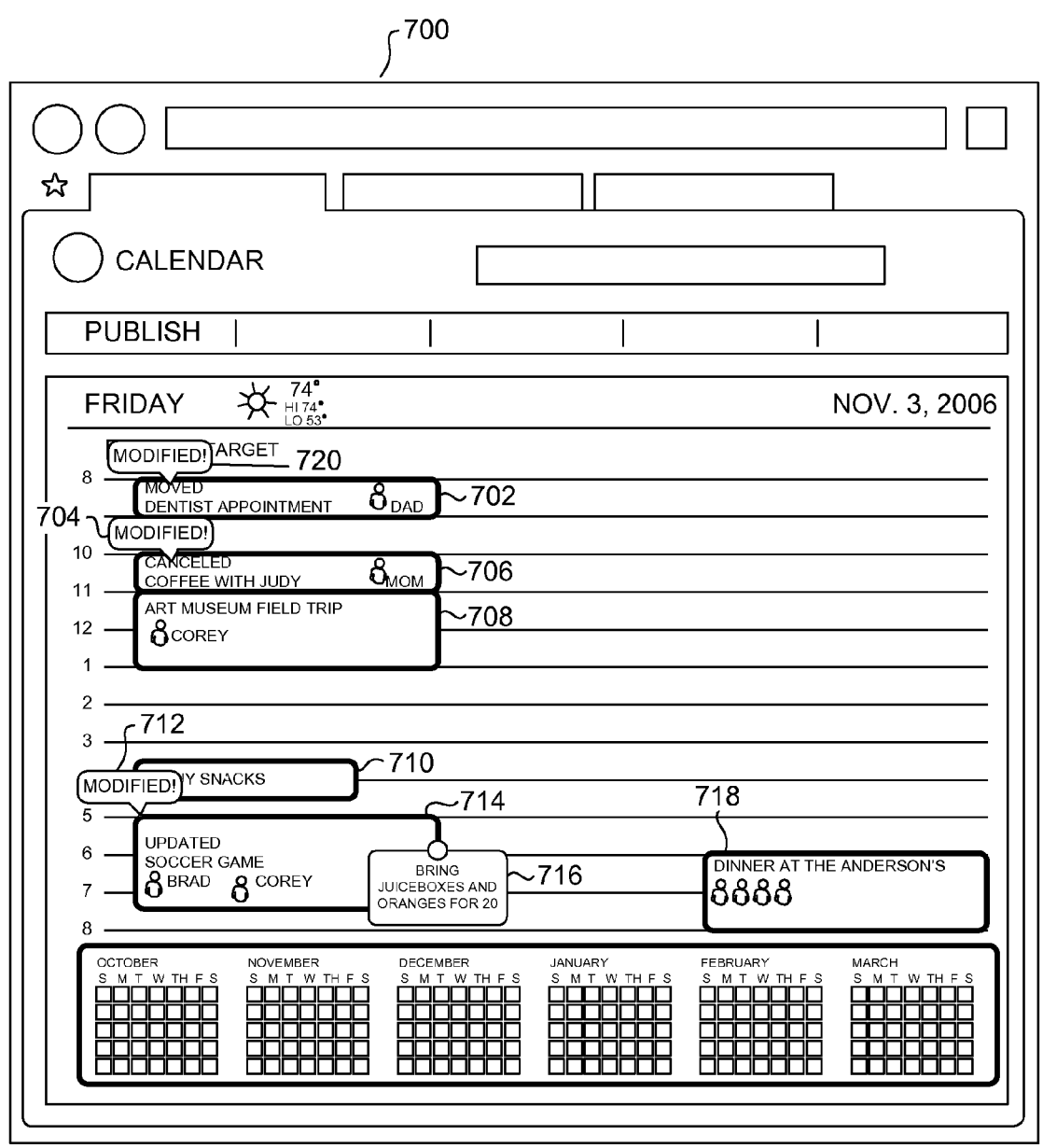
FIG. 7 is an exemplary screen display showing an example of modification notices.

After Mom modifies calendar items, Dad again accesses the Nov. 3, 2006 day view, which now includes modification notices as displayed in calendar view 700 of FIG. 7. Because the modification by Mom occurred prior to the current calendar access by Dad, Dad is viewing the calendar view having the modification notice for the first time since Mom's modifications. Accordingly, modification notices 704, 712, and 720 are displayed to notify Dad that calendar items have been modified. Dad may view modification notice 720 and recognize that his dentist appointment has been moved; modification notice 704 and recognize that Mom's scheduled coffee with Judy has been canceled; and modification notice 712 and recognize that the soccer game event has been updated. In one embodiment, modification notices 704, 712, and 720 may be displayed until Dad indicates a recognition of the calendar modification, such as, for example, by requesting to remove the modification notice; requesting to remove the modification action from the calendar view; requesting to remove the original calendar item that was subsequently modified; or requesting to view modification details such as modification details 802 in FIG. 8.

Figure 8:
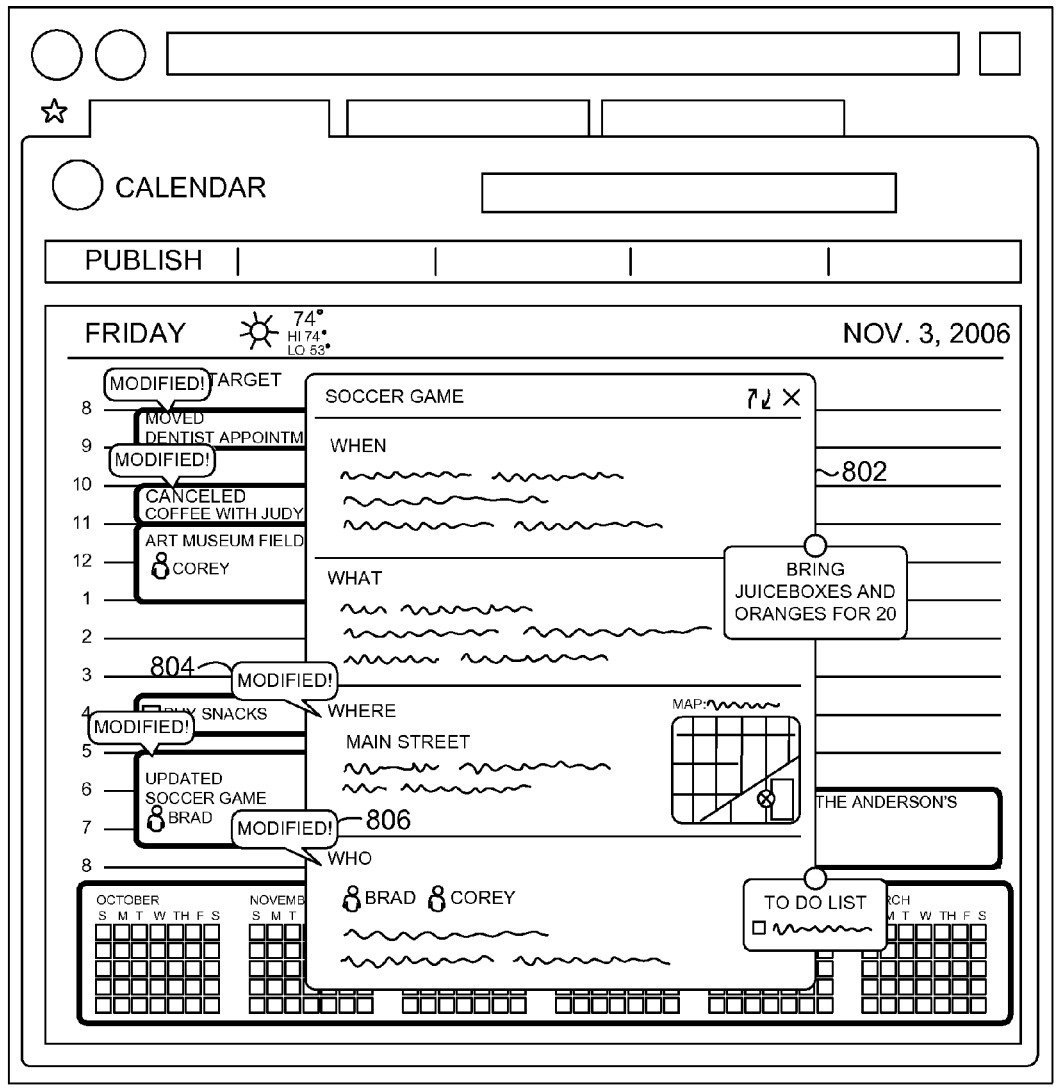
FIG. 8 is an exemplary screen display showing an example of modification details.

Dad may select to view modification details 802, as illustrated in FIG. 8. Upon selecting to view modification details 802, such as clicking on modification notice 712, the modification details are available to Dad to view. In one embodiment, a selection to view modification details 802 may be made by a right click, a menu selection, or double clicking the modification notice. In another embodiment, a selection to view modification details may be eliminated. Alternatively, modification details 802 may automatically be displayed when a user accesses a relevant calendar view. As shown in FIG. 8, modification details notices 804 and 806 are displayed for Dad to view so that Dad may have notice of the specific details modified. In one embodiment, modification detail notices 804 and 806 may resemble the modification notices 704, 712, and 720 of FIG. 7. In another embodiment, modification detail notices may include any sound, bubble with text, icon, text format, feature format, or the like.

Figure 9:
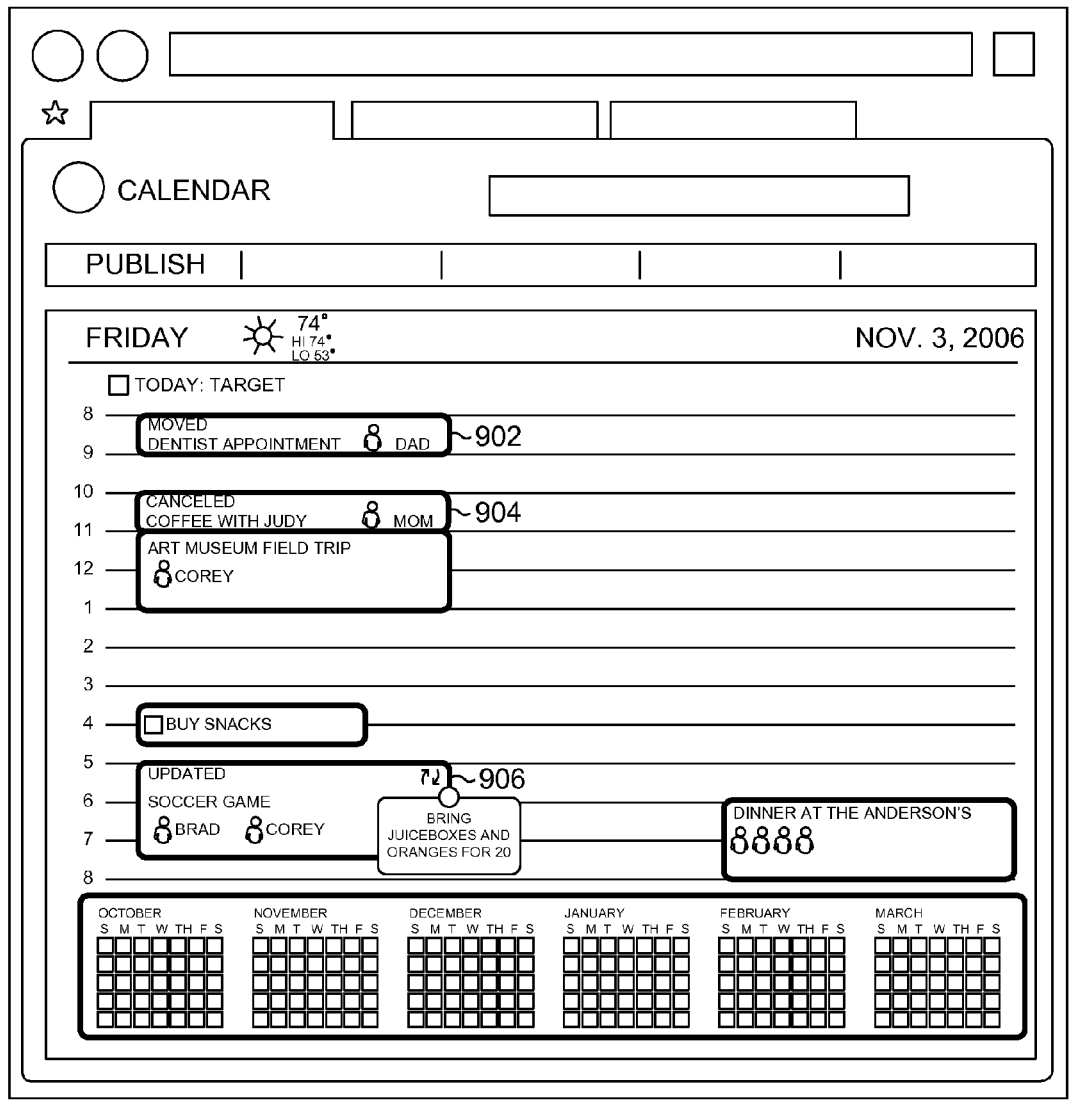
FIG. 9 is an exemplary screen display showing an example of a specific day calendar view, wherein the electronic calendar modifications are no longer new to the shared electronic calendar user.

At a later time, Dad may again access the Nov. 3, 2006 day view as shown in FIG. 9. As illustrated in FIG. 9, the modification notices 720, 704, and 712 are no longer displayed. Dad, however, may continue viewing the previous calendar modification actions made by Mom (e.g., "Moved," "Canceled," and "Updated" as displayed at 902, 904, and 906 in FIG. 9) even though the modification is no longer new to him. In such a case, the modification action may remind Dad about the original calendar items and the modifications. Alternatively, a previous modification action may no longer be viewable by a viewing user. Whether a previous modification action continues to be displayed may depend on the specific embodiment or may depend on the viewing user's preference. For example, in one instance, an embodiment may be configured to delete a calendar modification action concurrently with deleting a corresponding modification notice. In another instance, an embodiment may be configured to delete a calendar modification action a specific amount of time (e.g., one week) following the deletion of the corresponding modification notice. In yet another instance, an embodiment may be configured to display the calendar modification action unless and until a viewing user requests to dismiss the modification action or acknowledges the modification action.

From the foregoing, it will be seen that this invention is one well adapted to attain all the ends and objects set forth above, together with other advantages which are obvious and inherent to the methods, computer-readable media, and graphical user interfaces. It will be understood that certain features and subcombinations are of utility and may be employed without reference to other features and subcombinations. This is contemplated by and is within the scope of the claims.

The invention claimed is:

1. One or more computer readable storage media having computer-executable instructions stored thereon that executes a method for updating a shared electronic calendar with at least one new electronic calendar modification notice, the method comprising:

identifying a first shared electronic calendar user accessing a calendar view of a shared electronic calendar at a first instance, the calendar view comprising an appointment calendar item associated with a specific time presented within a view of a particular day within the calendar, a view of a particular week within the calendar, a view of a particular month within the calendar, or a view of a particular year within the calendar, wherein multiple shared electronic calendar users view and modify the same shared electronic calendar;

identifying a second instance the first shared electronic calendar user accessed the shared electronic calendar, wherein the second instance precedes the first instance the first shared electronic calendar user accesses the shared electronic calendar;

determining a new electronic calendar modification associated with the appointment calendar item in the calendar view accessed by the first shared electronic calendar user at the first instance, wherein the new electronic calendar modification is provided by a second shared electronic calendar user following the second instance the first shared electronic calendar user accessed the shared electronic calendar; and based on the new electronic calendar modification associated with the appointment calendar item in the calendar view, outputting a new electronic calendar modification notice, the new electronic calendar modification notice being displayed adjacent to the corresponding appointment calendar item in the calendar view accessed by the first shared electronic calendar user at the first instance.

2. The method of claim 1, wherein the first shared electronic calendar user is identified via login information.

3. The method of claim 1, wherein the second instance immediately precedes the first instance the first shared electronic calendar user accesses the shared electronic calendar.

4. The method of claim 1, wherein determining at least one new electronic calendar modification comprises identifying a modification instance that occurred after the second instance.

5. The method of claim 1, wherein the at least one new electronic calendar modification comprises a cancellation, a deletion, a move, an update, or a combination thereof.

6. The method of claim 1, wherein outputting the at least one new electronic calendar modification notice comprises displaying the at least one new electronic calendar modification notice to the first shared electronic calendar user.

7. The method of claim 1, wherein outputting the at least one new electronic calendar modification notice comprises transmitting the notice to a client-computer associated with the first shared electronic calendar user.

8. The method of claim 1, wherein the at least one new electronic calendar modification notice is a sound, a bubble, an icon, a text format, or a combination thereof.

9. The method of claim 1, wherein the at least one new electronic calendar modification notice includes at least one modification detail.

10. A graphical user interface embodied on one or more computer-readable storage media and executable on a computer, said graphical user interface comprising:

a first display area of a shared electronic calendar configured to display at least one new electronic calendar modification notice to provide a first shared electronic calendar user notice of at least one new electronic calendar modification entered by a second shared electronic calendar user, wherein display of the at least one new electronic calendar modification notice is determined based on an identification of the first shared electronic user and an identification of a previous instance the first shared electronic user accessed the shared electronic calendar, the at least one new electronic calendar modification notice being displayed proximate to a corresponding calendar item within a display of the shared electronic calendar having a calendar view of a specific day, week, month, or year.

11. The graphical user interface of claim 10, wherein the at least one new electronic calendar modification notice comprises a sound, an icon, a text format, a bubble, or a combination thereof.

12. The graphical user interface of claim 10 further comprising a second display area configured to display at least one modification detail.

13. One or more computer-readable storage media embodying computer-executable instructions for performing a method of notifying a viewing shared electronic calendar user of at least one shared electronic calendar modification, the method comprising:
   identifying the viewing shared electronic calendar user accessing a calendar view of a shared electronic calendar at a current instance, the calendar view comprising a display of a specific day having a calendar item presented within the display of the specific day;
   identifying a previous instance the viewing shared electronic calendar user accessed the shared electronic calendar;
   determining at least one new shared electronic calendar modification entered by a modifying shared electronic calendar user after the previous instance the viewing shared electronic calendar user accessed the shared electronic calendar; and
   determining if the viewing shared electronic calendar user has accessed a same calendar view of the specific day since the at least one new shared electronic calendar modification entered by the modifying shared electronic calendar user, wherein
   if the user has accessed the same calendar view of the specific day since the at least one new shared electronic calendar modification, displaying the calendar view of the specific day without a modification notice, and
   if the user has not accessed the same calendar view of the specific day since the at least one new shared electronic calendar modification, displaying the calendar view of the specific day with a modification notice displayed adjacent to the corresponding calendar item.

14. The one or more computer-readable media of claim 13, wherein the previous instance the viewing shared electronic calendar user accessed the calendar view of the shared electronic calendar immediately precedes the first instance the first shared electronic calendar user accesses the calendar view of the shared electronic calendar.

15. The one or more computer-readable media of claim 13, wherein the at least one new electronic calendar modification notice comprises a sound, an icon, a text format, a bubble, or a combination thereof.

16. The one or more computer-readable media of claim 13, wherein outputting the at least one shared electronic calendar modification notice includes outputting at least one modification detail.

17. The one or more computer-readable media of claim 13, wherein the at least one shared electronic calendar modification comprises a cancelation, an uncancelation, a deletion, an update, a move, or a combination thereof.

18. The one or more computer-readable media of claim 13 further comprising:
   receiving an indication to view modification details; and
   in response to receiving the indication to view modification details, displaying one or more modification details within the same calendar view of the shared electronic calendar.

\* \* \* \* \*